Patented July 12, 1932

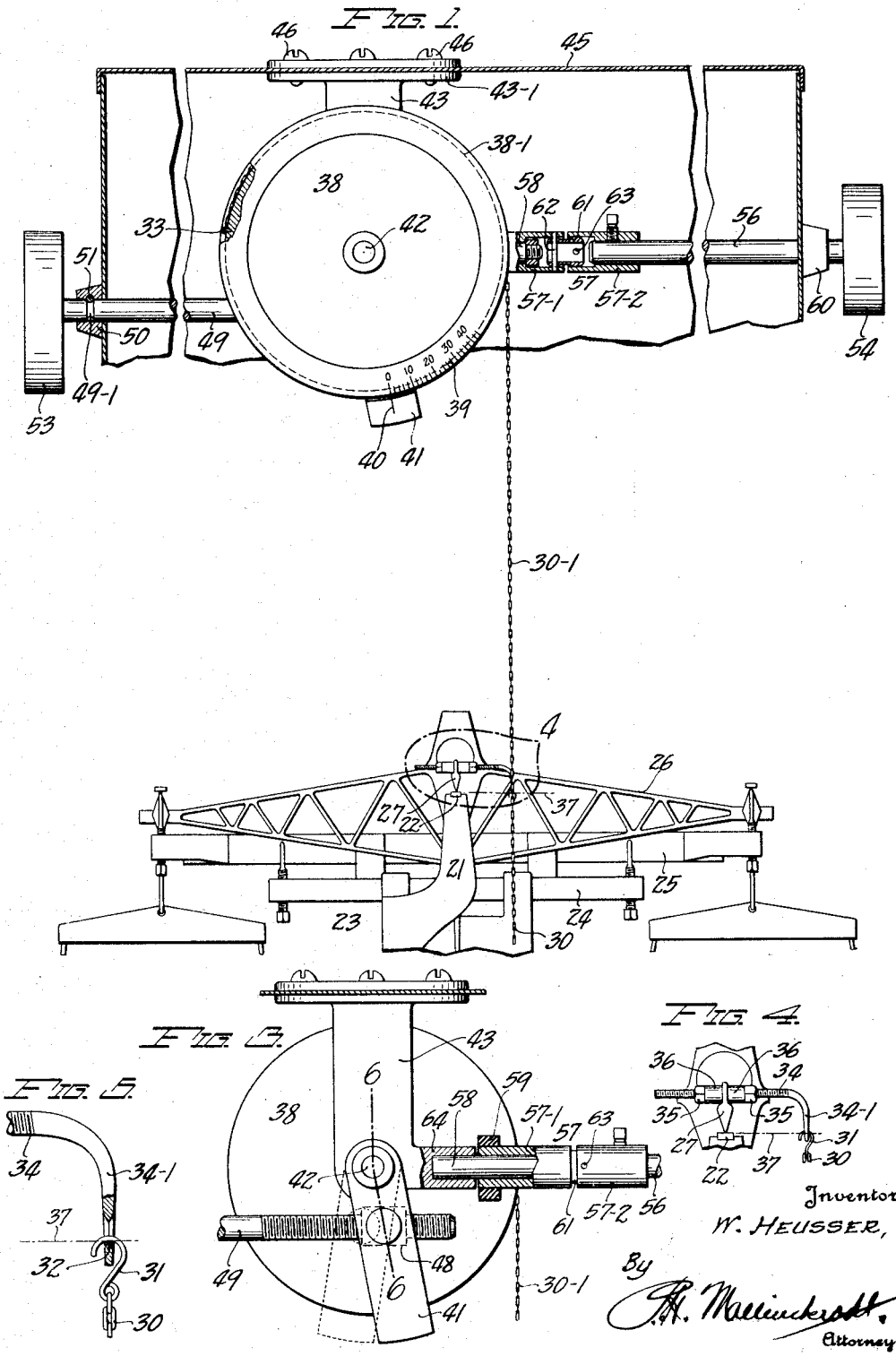

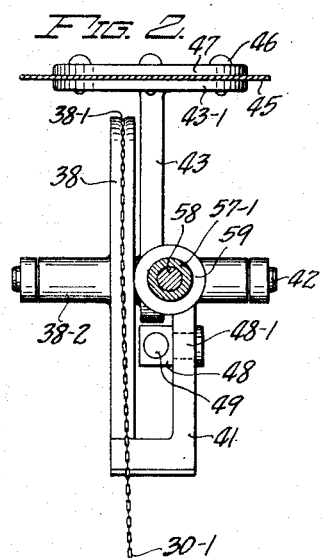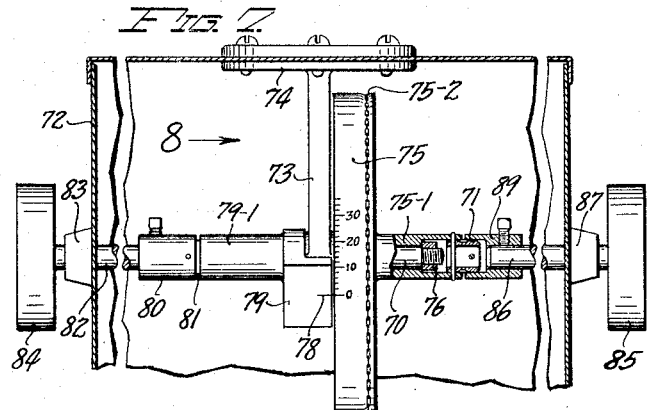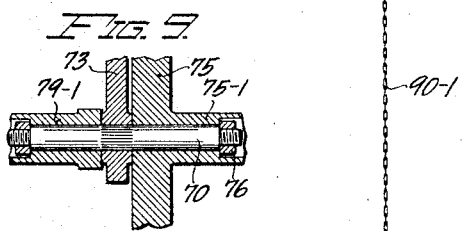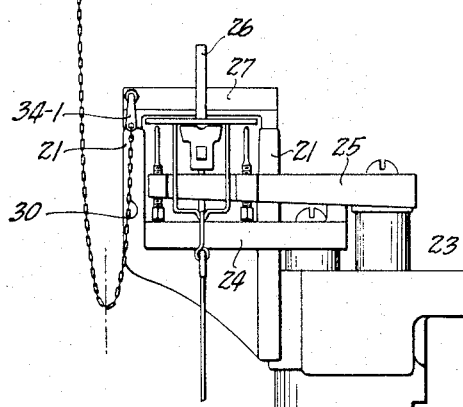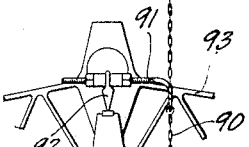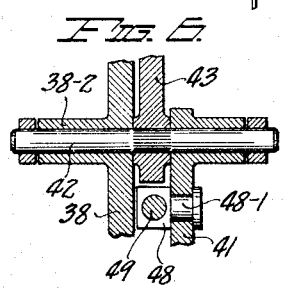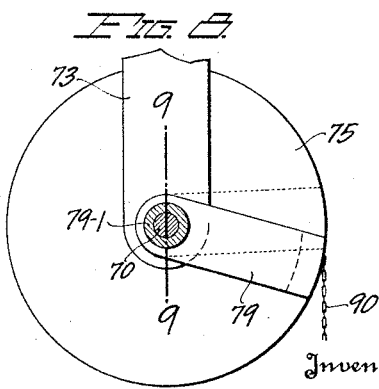

1,867,008

UNITED STATES PATENT OFFICE

WILFRID HEUSSER, OF SALT LAKE CITY, UTAH

CHAIN-POISE VARIABLE WEIGHT BALANCE

Application filed September 27, 1930. Serial No. 484,762.

This invention relates to a chain-poise variable weight balance, and more particularly to improvements upon the one forming the subject of my U. S. Patent No. 1,702,006 issued February 12, 1929.

The principal objects in view in this invention are similar to those stated in the said patent, and are as follows:

First. To render the operation of precise weighing more rapid.

Second. To increase the convenience to the operator.

Third. To be simple and efficient.

Fourth. To be durable and not likely to get out of order.

While this invention is particularly applicable to precision balances, its utility is not restricted thereto. The type precision balance particularly concerned is distinguished by a suspended chain whose length may be varied and used as a variable weight.

In the invention claimed in my aforesaid patent, the outstanding advantage is that the weight scale is adjustable, so that its zero point may be brought into coincidence with the weight indicator when the balance is in equilibrium.

In the present invention, however, instead of employing a linear weight scale, as in the aforesaid patent, I now make use of a circular weight scale. This scale may be graduated either on a side face or on the circumferential face of a disk or wheel. In weighing, the chain is wound or unwound, as the case may be, which enhances the convenience of the device in manipulating the chain as well as in the reading of the scale.

The features of this invention, for which the protection of Letters Patent of the United States is desired, are collectively grouped in the claims concluding this specification.

In the drawings, which illustrate several desirable forms of this invention,

Fig. 1 represents a fragmentary front elevation of one form, in which the scale graduations are on an end face of the wheel;

Fig. 2, a fragmentary end elevation corresponding to Fig. 1;

Fig. 3, a rear elevation, reflected from a mirror plane, of the scale disk with contiguous parts, portions being broken away;

Fig. 4, an enlargement of parts included within the broken line 4 in Fig. 1;

Fig. 5, an enlargement of a portion of Fig. 4, partly in section;

Fig. 6, a section taken on line 6—6, Fig. 3;

Fig. 7, a fragmentary front elevation, partly in section, showing a modified form in which the scale graduations are on the circumferential face of the wheel;

Fig. 8, an elevation of the scale disk with contiguous parts in the foreground, viewed in the direction of arrow 8, Fig. 7; and, Fig. 9, a section taken on line 9—9, Fig. 8.

Referring to the drawings, the numeral 20, Fig. 2, denotes the center column of a structure 23, which may be that of a standard Heusser analytical balance. On this column may be mounted a beam bearing support 21, a beam support 24, a hanger support 25, and a beam 26, all of which may be arranged in the customary manner.

The weight of the beam and any loads carried on it, is transmitted directly onto the bearing 22 through the usual main edge member 27. The oscillating system, which is composed of the beam and all the parts which move with it, has its axis of oscillation at the vertex of the acute angle or V formed by the mutually intersecting side planes of the main edge-member as usual. The main edge-member is also known as the center edge-member.

The variable weight may consist of a chain 30, one end of which is provided with a hook 31 hanging on an auxiliary edge 32, this edge being formed in the depending arm 34—1 of an auxiliary edge-member 34. The auxiliary edge-member consists preferably of a threaded stem rigidly secured by means of nuts 35 in bosses 36, the bosses preferably forming integral parts of the main edge-member 27. The vertex of auxiliary edge 32 should be substantially on the same level as the bearing of the main edge, as indicated by line 37 in Figs. 1 and 4. At the same time, it is desirable that the auxiliary edge, which naturally is spaced transversely apart from the axis of oscillation, should be adjustable for the purpose of equilibrating the oscillating system. Such adjustment may be obtained by means of the threaded stem 34 and nuts 35.

It will be noted that the variable weight effect upon the oscillating system is secured by increasing or diminishing the length of the portion 30—1 of the chain 30, this feature being common to all chain balances.

The terminal of the chain portion 30—1 may be fastened to a chain wheel 38, Figs. 1, 2 and 3, by any suitable means, for example, a pin 33, and the chain be wound on the peripheral face of the wheel, for which purpose a suitable groove 38—1 may be provided. By rotating the chain wheel in the proper direction, the chain is unwound, thus increasing the suspended length thereof. Substantially one-half of any such increased length is added to the portion 30, which may be called the "live" portion of the chain, and directly affects the balance.

By properly graduating the chain wheel, whose plane in this instance is transverse to the line of vision of the user, in the form of a circumferential scale lying in a face plane thereof, as indicated at 39 in Fig. 1, and when this scale is in proper registry with a line of reference 40 on an indicator 41, the weight effect of any such suspension increase, upon the balance, may be read off directly from the scale 39. The method of using this balance will presently be given in detail.

The chain wheel 38 may be provided with a hub 38—2 and be rotatably mounted on a shaft 42 suitably secured in a hanger 43, for example, by means of longitudinal knurling having a light press fit in the hanger.

The hanger may be secured to the usual balance casing 45 by any suitable means, such as screws 46 and a clamping piece 47. Journaled also on the shaft 42, is the aforesaid indicator 41. Suitably disposed in the body of the indicator so as to have limited rotary motion, is a protruding head 48 into which is screwed the threaded extremity of a rotatable shaft 49. Near its opposite end, shaft 49 may be journaled in a bearing 50 and be held against longitudinal motion by means of a pin 51 secured in bearing 50 and working in groove 49—1. This shaft is provided with a thumb wheel 53 rigidly secured for manual actuation.

By turning the wheel 53, the indicator 41 may be moved a certain limited distance back and forth along the circumference of the disk 38, so as to effect an angular displacement of the indicator relative to the axis of the wheel, whereby the significant line 40 may be variously positioned. The dotted lines in Fig. 3 denote one alternate position of indicator 41.

The chain wheel 38 may be manually rotated by means of a thumb wheel 54, which is rigidly mounted on a shaft 56, the latter being flexibly connected through a coupling 57, to a shaft 58. Rigidly mounted on sleeve 57—1 of this coupling is a friction wheel 59, the latter being in close contact with the disk 38, so that motion from the thumb wheel 54 may be transmitted to the chain wheel. Shaft 56 may be rotatably mounted in a bearing 60 supported by the casing 45. The flexible coupling 57, in addition to sleeve 57—1, includes a companion sleeve 57—2, these sleeves being connected to each other by an inner sleeve 61, the latter being fastened to the respective outer sleeves by means of pins 62 and 63 respectively. The shaft 58 may be journaled in an arm 64 projecting integrally from hanger 43.

In using this balance, the oscillating system is first equilibrated by turning the thumb wheel 54 so as to lower or raise the chain portion 30—1 as may be required. As soon as this is accomplished, the indicator 41 is moved in the proper direction by means of the thumb wheel 53, until the line 40 coincides with the desired graduation of the scale 39, usually of course, the zero point. The balance is now ready for weighing, which is accomplished by lowering as much of the chain as is necessary to counterbalance the load being weighed. Obviously, the line 40 against the scale 39, indicates the desired weight.

The modified or second construction appearing in Figs. 7 and 8, has the plane of the chain wheel substantially in the line of vision of the user, but gives virtually the same result as the construction just described. Since the weight scale is not so advantageously displayed in this alternate form, due to foreshortening of many of the spaces between the graduations, the first construction may generally be preferred by users.

In the second construction, a shaft 70 may be rigidly secured in a hanger 73 forming an integral part of a foot 74 attached to a casing 72 in a manner similar to that hereinbefore described in connection with Fig. 2. A wheel 75 having the hub 75—1 is rotatably mounted on the shaft 70 and held in place by a nut 76. The cylindrical face of the wheel 75 has the desired graduations and is disposed so as to register with a mark 78 on an indicator 79. This indicator has a hub 79—1, which in conjunction with a sleeve 80 and an inner sleeve 81, forms a flexible coupling connecting the indicator to a shaft 82, the latter being journaled in the bearing 83 attached to the casing 72. The shaft 82 is manipulated by a thumb wheel 84.

The wheel 75 is manipulated by means of a thumb wheel 85, the latter being rigid on a shaft 86 journaled in the bearing 87 also attached to the casing 72. A sleeve 89, rigid on the shaft 86, is flexibly connected to hub 75—1 by means of inner sleeve 71, thereby forming a flexible coupling similar to the one previously described herein.

The operation of this second construction, in weighing, will be obvious, since the chain 90—1 is wound up in and unwound from the groove 75—2 in wheel 75, the chain having its other end 90 hanging from an auxiliary edge-member 91 mounted on a main edge-member 92, the latter being carried by a balance beam 93, all in a manner similar to that hereinbefore described.

Since chain-poise variable weight balances are not broadly new, I do not claim such a balance broadly, but only as it includes my improvement, which consists of an equilibrating wheel suitably graduated, an indicator movable relatively to the equilibrating wheel, and the appurtenances necessary to render these operative.

Although specific embodiments of this invention are herein shown and described, it should be clearly understood that various changes or modifications can easily be made without jeopardizing the patent protection defined in the following claims.

Having fully described my invention, what I claim is:

1. A balance, including in combination, an oscillating system, a flexible weight having one end thereof connected to a member of the oscillating system, a graduated wheel for raising or lowering the other end of said flexible weight, and an indicator disposed to register with graduations of said graduated wheel, said indicator being movable along the graduated portion of the wheel so as to have an angular displacement relative to the axis of said wheel.

2. A balance, including in combination, an oscillating system, a flexible weight having one end thereof connected to a member of the oscillating system, a graduated wheel for raising and lowering the other end of the flexible weight, an indicator movably disposed to register with graduations of said graduated wheel, and means operative to move said indicator along the graduated portion of the wheel so as to have an angular displacement relative to the axis of said wheel.

3. A balance, including in combination, an oscillating beam having a main edge-member, an auxiliary edge-member comprising a stem transversely adjustable in relation to said main edge-member and a depending arm integral with said stem; and a variable weight suspended from said auxiliary edge-member.

4. A weighing device, including in combination, a rotatable wheel having graduations, a flexible weight disposed to be wound or unwound by the rotation of said wheel, and an indicator disposed to register with graduations of said wheel, said indicator being movable along the graduated portion of the wheel so as to have an angular displacement relative to the axis of said wheel.

5. A balance, including in combination, a rotatable wheel having graduations on a face plane thereof, a flexible weight disposed to be wound or unwound by the rotation of said wheel, and an indicator disposed to register with graduations of said wheel, said indicator being movable along the graduated portion of the wheel so as to have an angular displacement relative to the axis of said wheel.

6. A weighing device, including in combination, a rotatable wheel having graduations on the cylindrical face thereof, a flexible weight disposed to be wound or unwound by the rotation of said wheel, and an indicator adjustably disposed to register with graduations on said cylindrical face.

7. A weighing device, including in combination, a flexible weight, a graduated wheel operably disposed to raise and lower said flexible weight, an indicator concentrically movable in relation to said graduated wheel, means operative to adjustably position said indicator, and means operative to rotate said graduated wheel relatively to said indicator.

8. In a weighing device, the combination, comprising an oscillating beam having a main edge-member, an arm having an auxiliary edge, a chain having one end thereof suspended from said auxiliary edge, a wheel operative to raise and lower the other end of said chain, said wheel having symbols denoting weights, and an adjustable indicator registering with the symbols on said wheel.

9. In a weighing mechanism having a casing, the combination, comprising a hanger, a rotatable wheel having weight symbols, supported by said hanger; an indicator arm concentric with said wheel, an oscillating member mounted on said arm, an operating shaft engaging said oscillating member, and a chain having one end thereof variably positioned due to rotation of said wheel and the other end positioned to influence said weighing mechanism.

10. In a weighing mechanism having a center edge-member, the combination, comprising a stem extending transversely adjustable of said center edge-member, said stem having an auxiliary edge integral therewith, and a weight chain suspended from said auxiliary edge.

In testimony whereof, I sign my name hereto.

WILFRID HEUSSER.